(No Model.) 2 Sheets—Sheet 2.
J. MANNING.
MACHINE FOR BEVELING STEREOTYPE AND ELECTROTYPE PLATES.
No. 418,292. Patented Dec. 31, 1889.
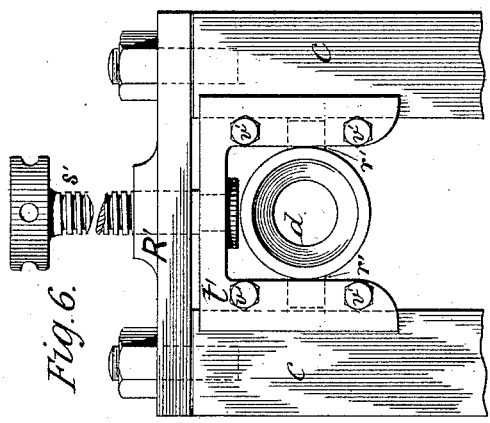
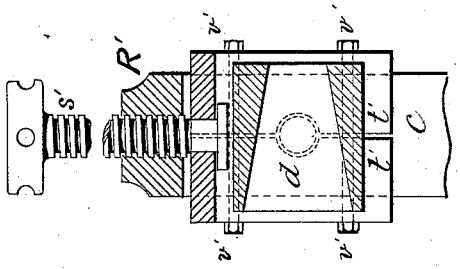
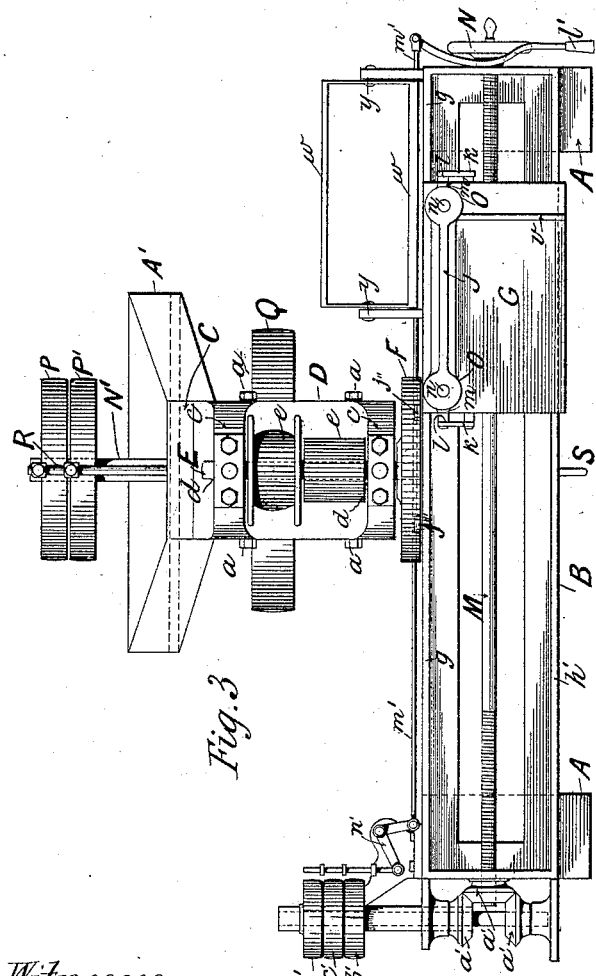
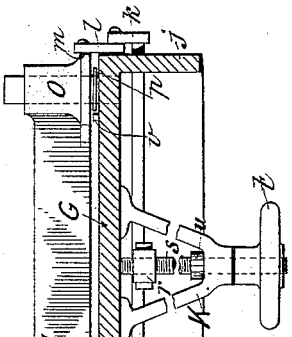
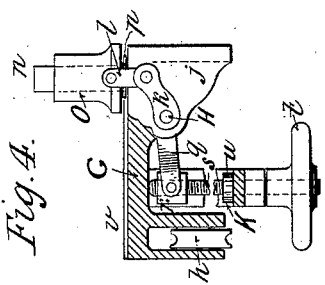
Witnesses.
George Brookes
Benjamin King
Inventor.
John Manning
per James Stevenson
Attorney.

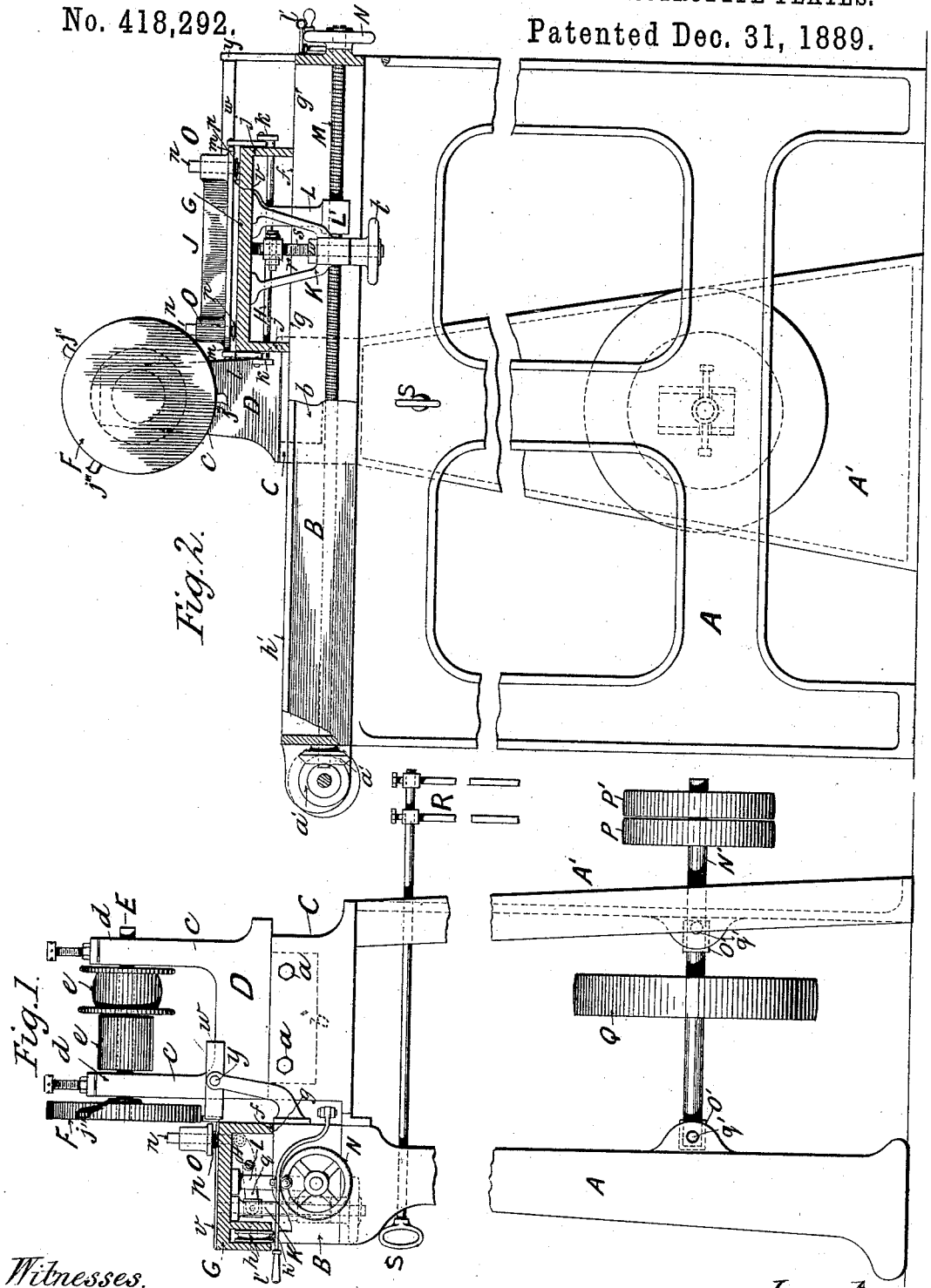

UNITED STATES PATENT OFFICE.

JOHN MANNING, OF LONDON, ENGLAND.

MACHINE FOR BEVELING STEREOTYPE AND ELECTROTYPE PLATES.

SPECIFICATION forming part of Letters Patent No. 418,292, dated December 31, 1889.

Application filed May 15, 1889. Serial No. 310,906. (No model.)

*To all whom it may concern:*

Be it known that I, JOHN MANNING, a subject of the Queen of Great Britain, residing at 26 and 28 Old Street, Aldersgate Street, London, England, have invented certain new and useful Improvements in Machines for Beveling Stereotype and Electrotype Plates, of which the following is a specification.

The object of my improved machine is to provide means for fixing and securing the stereo or electro plate to be beveled to the traveling table of the machine in a more expeditious manner than has hitherto been employed; for causing the traveling table of the machine to derive its motion, both when cutting and on the return motion, from a screw or worm actuated by power in addition to the provision of means for producing the same motions by hand; for the employment of three cutters suitably arranged, so that each cutter has its own function of cutting, squaring, and beveling, respectively, to perform, and for providing such bearings that the horizontal or other positions of the upper shaft, carrying a disk to which the cutters are adapted, and of the shaft below, supplying the power to this upper shaft, may be varied, according as circumstances may necessitate.

In machines hitherto constructed the means employed for fixing the plate to be beveled to the traveling table of the machine have been such as to obstruct and hinder the workman from having a free view of the plate, which free view is very essential in order that the plate may be properly fixed and adjusted in the position for being acted on by the cutters. This drawback I entirely remove by my improvements, allowing to the workman a free view of his work, and I also cause the traveling table to which the stereo or electro plate is secured to travel (both when bringing the plate under the action of the cutters and on the return movement) by means of a screw or worm, which may be driven so as to produce the two motions of the sliding plate, before referred to, by means of bevel-wheels deriving their motion from pulleys, in addition to the provision which I make of a hand-wheel, which hitherto has been the only means employed for giving such motions to the screw, in order that—as, for instance, in setting the stereo or electro plate—the sliding table may be moved into any required position.

In order that my improvements may be more fully understood, I will now proceed to describe the same with reference to the accompanying drawings, in which the same letters refer to the same parts in each of the figures.

Figure 1 shows an end elevation of the machine, the sliding table G having the end cut away in order to show more clearly the working of arrangements beneath. Fig. 2 represents a front view of the machine, having half of the front of the frame B cut away, thus clearly showing the working of the screw or worm M with its nut L', and of the hand-wheel and screw *s*, engaging in its nut *r*. Fig. 3 shows a plan view of the whole machine. Fig. 4 is a transverse sectional view, and Fig. 5 a longitudinal sectional view, of the sliding table G. Figs. 6 and 7 show, respectively, a front elevational and a horizontal sectional view of the bearings, in which I cause to run the shaft E, carrying pulleys *e e*, Figs. 1 and 3, and disk F, Figs. 1, 2, and 3.

In Figs. 1, 2, and 3, A and A' are frames of the machine. To the frame A is fixed a hollow bed B, of shape as shown. To frame A' is fixed casting C, and to this is fixed the small frame D by means of the screws *a a*, casting C being hollow to receive the lug *b*, (shown by the dotted line, Figs. 1 and 2,) the screws *a a* working on the lug. The two uprights *c c* of the frame D are provided at *d*, Figs. 1 and 3, with bearings, in which bearings run shaft E, to which is fixed disk F and the pulleys *e e*. Above the hollow bed B is a small traveling table G, the square edge *f*, Fig. 1, of the inner side of which runs on the square edge *g g* of the inner side of frame B, Figs. 1 and 3. The outer side of this traveling table, being split, contains at either end a small roller *h*, running on the conical top of the outer side *h'* of frame B, Figs. 1, 2, and 3.

In Fig. 2 one-half of the outer side of B is cut away to give a front view of the arrangement applied to the under side of the sliding table G, and in Fig. 1 the end of said sliding plate is removed, thus showing an end view of the same arrangement. To the under side of sliding table G is adapted a small rocking shaft H, Figs. 1 and 2, protruding through ends $j\,j$. To each of these protruding ends of the shaft H is adapted a small lever $k\,k$, these levers being connected with links $l\,l$, secured to the ends $m\,m$ of the platen J, situated on the inner side of the top of the sliding table G. This platen is free to move vertically up and down on the studs $n\,n$, passing through the bosses O O, and is assisted in rising vertically by means of small spiral springs $p\,p$, placed between the platen J and top of sliding table G, Figs. 1, 2, 4, and 5.

At the middle of the shaft H is attached thereto a lever $q$, having a forked end. To this forked end is adapted a trunnion-nut $r$, in which works the screw $s$, actuated by the hand-wheel $t$, this screw being kept in position by means of the collar $u$ and bracket K. All this said arrangement is more clearly shown at Figs. 4 and 5, where the bracket L, referred to in the succeeding paragraph, is omitted.

To the under side of G, Figs. 1 and 2, is also affixed a bracket L, the bottom of which terminates in a nut $L'$, in which engages the screw or worm M.

Standing up from the face of sliding table G and fixed thereto is a small rib $v$, in height about one sixty-fourth of an inch and at right angles to the bars $w\,w$ of a swinging gage pivoted at $y\,y$. This small rib or "setting-line" $v$ is used in connection with the swinging gage $w$, allowing the electro or stereo plate to be set "square" with the cutters.

To one end of the screw or worm M, Fig. 3, is provided a hand-wheel N, and to the other end is adapted three bevel-wheels $a'\,a'\,a'$, actuated by the pulleys $b'\,b'$, these two pulleys being used for reversing the motion of the screw M, and thereby reversing the motion of the sliding table G, the pulley $c'$ being a loose pulley.

A shaft $N'$, Figs. 1 and 3, adapted by means of trunnion-bearings $O'\,O'$ to the lower part of the frames A and $A'$, carries at its outer extremity the "fast" and "loose" pulleys P and $P'$, and in a position between the frames vertically beneath the flanged pulley $e$, Figs. 1 and 3, carries a third pulley Q.

When the machine is at rest and it is wished to bevel a stereo or electro plate, the operator by means of a hand-wheel $t$ and screw $s$, engaging in nut $r$ and giving motion to the rocking shaft H and levers $k\,k$ and links $l\,l$, having caused platen J, Fig. 2, to rise vertically, places the plate to be beveled on the table G, pressing it against both the bar $w$ of the swinging gage and also against the small setting-line $v$. The plate is then fixed by turning the hand-wheel $t$ in the reverse way, and thereby bringing down platen J rigidly on it. The traveling table G is then brought into the required position for allowing the stereo or electro plate thereto affixed being acted on by the cutters $j'\,j''\,j'''$, adapted to disk F.

The arrangements of the cutters to perform their separate functions are as follows: The cutter $j'$, being set with its cutting-face lower than the cutting-faces $j''$ and $j'''$, when acting on the plate to be beveled, cuts through and entirely removes the "clump" or rough metal, (extending the length of one side of the stereoplate caused by the inpouring of metal in the mold in which the electro or stereo plate is cast.) The cutter $j''$, being set with its cutting-face higher than the cutting-face of $j'$, but "set" more toward the outside of the machine, acts in its turn on the plate, and cutter $j'''$, being inclined still more than $j''$ toward the outside of the machine, completes the whole operation from detaching the clump to beveling at the required angle the stereoplate without removing it from the machine, and with only one "fixing" or "adjusting."

A strap from the main shaft of the building in which my machine is situated runs on loose pulley $P'$, Figs. 1 and 3. When it is required to set the disk in motion, it is only necessary by means of the striking-fork R, moved by the rod $s$, to cause the strap to run on fast pulley P, the motion from Q to flanged pulley $e$ being also imparted by a strap or belt. From the broad pulley $e$, Figs. 1 and 3, is a connection by means of a strap or belt to the loose pulley $c'$, Fig. 3. When it is required that the table G should travel by moving the lever $l'$, Figs. 1, 2, and 3, connected by means of a rod $m'$, and crank $n'$, Fig. 3, to a fork, causing the strap to run from pulley $c'$ on one of the pulleys $b'\,b'$, motion is given to the table G, varying in direction according as to which of the pulleys $b'$ the belt is caused to run on.

The bearings situated at $O'$, Fig. 1, I construct in such a manner that according as I wish I may set shaft $N'$ either to the right or left hand of the center of the machine, Fig. 2. This sidewise shifting is accomplished by means of screws $q'\,q'$. (Shown in Fig. 1, and dotted at Fig. 2.) A like sidewise motion is also allowed to casting D by means of inserting or withdrawing the screws $a\,a\,a\,a$, adapted to either side, respectively, of casting C, and working on lug $b$, attached to D, but dependent in the hollow of C.

I will now proceed to describe the particular bearings in which I cause to run the shaft E, carrying disk F and pulleys $e\,e$, Fig. 6 being a front view and Fig. 7 a vertical sectional view of these bearings. The bearing $d$ is bored in a conical manner, as shown, to receive the shaft, which is of the same shape at the place wherein it rests in the bearing, the bearing $d$ having cast on it the trunnions $r'\,r'$, running in the split-carrier $t'$. (Shown at Fig. 7.) This carrier is fastened together by bolts $v'\,v'\,v'\,v'$, the screw $s'$ being adapted to the top of the carrier $t'$, and engaging on the threads in the cap $R'$ of the bearing-frame C in such a manner that by raising or lowering the screw the carrier in which $d$ works may also be raised or lowered, and according as to which carrier is raised or lowered, either that carrier in the frame nearer to the disk or that carrier in the frame more remote from the disk. The disk is thereby given an upward or downward tilt, thus decreasing or increasing the angle at which the bevel is produced.

Having fully described my invention, what I claim, and desire to secure by Letters Patent, is—

1. In a machine for beveling stereo and electro plates, the employment, in combination with pulleys $b'$ $c'$ $b'$, bevel-wheels $a'$ $a'$ $a'$, and screw or worm M, of a sliding table G and a revolving disk F, with cutters $j'$ $j''$ $j'''$, substantially as and for the purposes herein set forth.

2. In a machine for beveling stereo and electro plates, the combination, with sliding table G, of platen J, capable of moving vertically on studs $n$, fitted with links $l$ $l$, and levers $k$ $k$, adapted to rocking shaft H, lever $q$, nut $r$, and screw $s$, actuated by hand-wheel $t$, all of which combination allows the operator to rigidly affix the plate to be worked to sliding table G, substantially as herein set forth.

3. In a machine for beveling stereo and electro plates, the use, in combination with the conically-turned shaft E, carrying the revolving cutting-disk F, of conical bearings $d$, mounted by trunnions $r'$ $r'$ in split carrier $t'$, sliding vertically between uprights $c$ $c$ of the frame D, whereby on actuating the screw $s'$ the required "tilt" is imparted to cutter-disk F, substantially as and for the purpose specified.

4. In a machine for beveling stereo and electro plates, the combination, with shaft N' and pulleys P P' and Q, of bearings O' and regulating-screws $q'$ $q'$ for allowing said shaft to be set sidewise out of center of machine, to correspond with position at which the frame D may be required to be set, substantially as herein set forth.

In testimony that I claim the foregoing as my invention I affix my signature in presence of two witnesses.

JOHN MANNING.

Witnesses:
JAMES STEVENSON,
JAMES ROBERT SLACK.